(No Model.)
S. M. FRIEDE.
COMBINATION SOFT AND HARD METAL PIPE COUPLING.
No. 521,437. Patented June 12, 1894.
Fig. I.
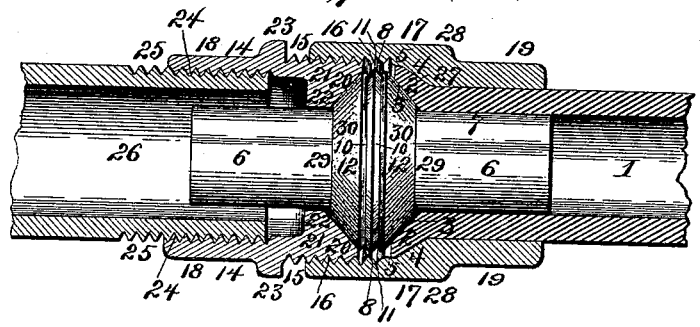
Fig. II.
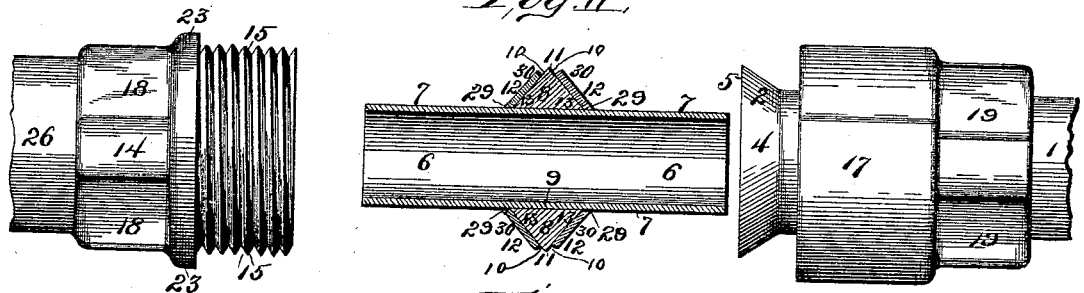
Fig. III.
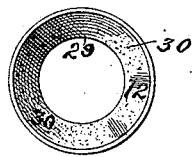
Fig. IV.
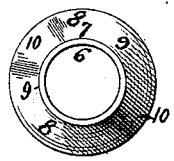
Attest:
Wm. H. ___
Benj. A. Knight.
Inventor
Samuel M. Friede.
By Knight Bros.
Attys.
THE NATIONAL LITHOGRAPHING COMPANY,
WASHINGTON, D. C.

UNITED STATES PATENT OFFICE.

SAMUEL M. FRIEDE, OF ST. LOUIS, MISSOURI, ASSIGNOR TO THE STAR COUPLER COMPANY, OF SAME PLACE.

COMBINATION SOFT AND HARD METAL PIPE COUPLING.

SPECIFICATION forming part of Letters Patent No. 521,437, dated June 12, 1894.

Application filed October 9, 1893. Serial No. 487,592. (No model.)

*To all whom it may concern:*

Be it known that I, SAMUEL M. FRIEDE, of the city of St. Louis, in the State of Missouri, have invented a certain new and useful Improvement in Combination Soft and Hard Metal Pipe Couplers, of which the following is a full, clear, and exact description, reference being had to the accompanying drawings, forming part of this specification.

This invention relates to combination union joints for soft and hard metal pipes, in which the bevel joint edges of the soft metal pipe and of the intermediary combined hard metal pipe and minor screw coupler collar are hermetically sealed against elastic washers that are embedded against the sides of a double bevel hard metal gasket, the major coupling screw collar, which engages with said combined minor screw collar and intermediary hard metal pipe, the hard metal pipe that is screw jointed into said intermediary pipe and the hard metal short splice pipe, on which the double bevel gasket is mounted; and the invention consists in features of novelty hereinafter fully described and pointed out in the claims.

Figure I is a transverse section, showing the coupled pipes in reverse position, and the splice pipe and gasket in elevation. Fig. II is an elevation of the pipe sections and screw coupling collars, with the projecting gasket and elastic washers in vertical section. Fig. III is a side view of one of the elastic washers; and Fig. IV is an end view of the center splice pipe, with an elevation of the bevel gasket mounted thereon.

Referring to the drawings:—1 represents the lead or other soft metal pipe, and 2 is its bevel flange joint lip, constituted of its inner bevel side 3, outer bevel side 4, and stub end 5.

6 represents a brass, or other hard metal splice pipe, the periphery 7 of one end of which fits tightly within the lead or other soft metal pipe section, and besides stiffening and tying the coupling joint in general, the said splice pipe stiffens said soft metal pipe and preserves it from bulging.

8 represents a close joint gasket, the bore 9 of which fits tightly around and midway thereon of said splice pipe. 10 are the duplex, bevel joint sides of said gasket, which are preferably formed at about a right angle to each other, but said angle may be either more acute or obtuse, and 11 is the projecting peripheral edge of said gasket.

12 represents rubber or other elastic seal washers, the inside faces 13 of which effect joint seal seats on the respective bevel sides of said gasket, with outer seal faces 30.

14 represents the brass or other hard metal combined, intermediate pipe and minor screw coupling collar, the outer coupling screw 15 of which engages with the internal screw 16 of the major coupling collar 17, when the joint is effected by the application of wrenches on the octagonal wrench seat 18, around the minor coupling collar 14 and a like octagonal wrench seat 19 around the major coupling collar 17.

20 represents a bevel inwardly projecting joint seat on the enlarged head 21 of the combined intermediate pipe and coupling collar 14, which joint seat when said coupling collars are screwed home, presses tightly against one of the elastic seal washers 12. 22 is the contact shoulder of said collar, that fits tight around that portion of the splice pipe 6 that is on line with the same, and stiffens the joint. 23 is a projecting peripheral rim around said combination, intermediate pipe and coupling collar, and 24 is an internal joint screw within the same, in which the peripheral screw 25 of the iron or other hard metal extension pipe 26 engages, to effect a tight joint.

27 represents a bevel, inwardly, projecting joint seat within the bulge end 28 of the major coupling collar, which joint seat engages with the bevel outer side 4 of the bevel flange joint lip 2 of the lead or other soft metal section pipe 1.

29 are the inner, circular edges of the elastic washers 12, which maintain a tight sealing contact with the periphery 7 of the splice-pipe 6, to aid in effecting the hermetic seal.

The operation of the coupling has mostly been indicated in the introductory description of the several parts, but it may be further stated that the device is designed especially to couple soft to hard metal pipes, that it effectively secures with the one operation, without the use of solder and the accompanying difficulties and dangers of its application; and the invention is an improvement on the patent issued to me, and my assignee, Isaac G. Brown, August 1, 1893, No. 502,665, for a combination hard and soft metal pipe coupler.

In making the coupling joint, it is preferable that the combined, intervening pipe section and minor coupling collar 14, which is preferably of brass, the rear joint screw 24 of which engages with the joint screw 25 of the iron pipe section 26, should first be seated in position on said pipe, and the double bevel, close joint gasket 8 mounted midway on the splice tube 6, and its elastic seal washers 12 mounted on said splice tube, against which their inner edges seal, and against the duplex bevel face of said gasket against which the sides in contact therewith seal; the said splice tube and its mounted bevel gasket and washers are then placed in position. The lead or other soft metal pipe 1, with the major coupling collar 17, mounted thereon, being on line with the intervening brass or other hard metal joint pipe and coupler, and with the iron pipe 26, then by means of wrenches, on the wrench seats 18 and 19, the above described coupling devices are brought into engagement with each other and turned until a close hermetic seal joint is thus effected. The rubber or other elastic washers 12 aid largely in effecting the hermetic seal of the coupling joint, and the combination brass intervening pipe section and screw coupling collar in the one element also adds to the effectiveness and facility in coupling of the joint. The hard metal center tube 6 that is internally bedded within the jointed pipe sections adds greatly to the strength of the whole pipe coupling, and in an especial manner to the soft metal pipe section; so that the pipe and joint cannot readily break, bend or crack, under adverse circumstances, such as the settling of a wall in the building, and consequently said junction cannot crack or work the joint loose. Also unlike a solder joint, when it is desired to disconnect the parts, it can be almost instantaneously effected, by the use of a wrench in this invention, without injury to either pipe or joint, which can as readily be closed again.

Another very important function of the elastic seal washers 12 is that they accommodate themselves by their give and take elasticity to the respective expansion and contraction of the jointed pipes, by the alternate flow of hot and cold water through the same, so that at the time of said expansion, by the like expansion of said elastic seal washers, the joint still maintains its tight closure, and in the succeeding contraction during the passage of cold water, the compression of said elastic seal washers, prevents the breakage of the pipe from the sudden contraction thereof.

Still another important function of my splice pipe 6, in conjunction with my double bevel gasket mounted thereon, with the elastic seal washers, is that said splice pipe and double bevel gasket hold said elastic seal washers in position while the joint is closing, as otherwise said elastic washers would frequently be forced or creep in the closing of the joint, either inward within the pipe, or outward beyond the joint, thus making a defective joint. Also said splice pipe and double bevel washer largely help both to direct and hold the jointing pipes, in the approach and consummation of the joint. It will also be seen that as the end of the splice pipe 6 is not on line with the outer end of the major coupling collar, but extends beyond it, to any degree required, the lead pipe, at its joint is materially reinforced thereby.

Having thus described my invention, what I claim as new therein, and desire to secure by Letters Patent, is—

1. In a pipe coupler, the combination of the soft metal pipe 1 having the bevel joint lip 2, the splice pipe 6, the close joint gasket 8, mounted on said splice pipe, the said gasket 8 having duplex bevel jointer sides 10, meeting at their peripheral edge 11, the combined intermediate, hard metal pipe and screw coupling collar 14, having the bevel inwardly projecting joint seat 20, the head 21, and the contact embracing shoulder 22, and the major screw coupling collar 17, having the bevel joint seat 27; substantially as described.

2. In a pipe coupler, the combination of the soft metal pipe 1 having the bevel joint lip 2, the close jointer gasket 8 having the duplex bevel joint sides 10, and their meeting, peripheral edge 11, the combined intermediate screw pipe, and minor coupling collar 14, having the bevel joint face 20, and the major screw coupling collar 17, having the bevel face 27; substantially as described.

3. In a pipe coupler, the combination of the soft metal pipe 1, having the flaring bevel joint lip 2, the close jointer gasket 8, having the duplex bevel joint sides 10, and their meeting, peripheral edge 11 pointing to the intervening space between the joint ends of pipes, the elastic seal washers 12, the combined, intermediate screw pipe and minor coupling collar 14 of hard metal, having the bevel joint face 20, and the major screw coupling collar 17, of hard metal having the bevel joint seat 27; substantially as described.

4. In a pipe coupler, the combination of the soft metal pipe 1, having the flaring bevel joint lip 2, the splice pipe 6, the close joint gasket mounted on said splice pipe, the said gasket having the duplex bevel joint sides 10, that meet at their peripheral joint pointer edge 11, the elastic seal washers 12, having the inner seal faces 13, the outer seal faces 30, and the seal edge 29, the combined intermediate screw pipe, and minor coupling collar 14 of hard metal, having the bevel joint face 20, the major screw coupling collar 17 of hard metal, having the bevel joint seat 27, and the hard metal screw jointed extension pipe 26; substantially as described.

5. In a pipe coupler, the combination of the soft metal pipe 1, having the bevel joint lip 2, the close jointer double faced gasket 8, having the periperal edge 11, the hard metal pipe 14, having the bevel joint face 20, and the elastic seal washers 12; substantially as described.

SAMUEL M. FRIEDE.

In presence of—
BENJN. A. KNIGHT,
A. M. EBERSOLE.